HENRY BRADT & JOHN OTIS.
Improvement in Corn Planters.

No. 123,080. Patented Jan. 30, 1872.

Witnesses.
Jno. S. Thornton
Charles Rogers

Inventors.
John Otis
Henry Bradt

UNITED STATES PATENT OFFICE.

HENRY BRADT AND JOHN OTIS, OF SCHENECTADY, NEW YORK.

IMPROVEMENT IN CORN-PLANTERS.

Specification forming part of Letters Patent No. 123,080, dated January 30, 1872.

*To all whom it may concern:*

Be it known that we, HENRY BRADT and JOHN OTIS, both of the city of Schenectady, in the county of Schenectady and State of New York, have invented new and useful Improvements in Corn-Planters; and we do hereby declare that the following is a full, clear, and exact description thereof, reference being had to the accompanying drawing forming a part of this specification, and to the letters of reference marked thereon.

Our invention relates to that class or division of agricultural implements known as corn-planters. It has for its object a simple, cheap, and reliable implement, which may be easily worked or operated by one horse and a boy, and which furrows, drops, and covers the seed with the most unerring precision. It is also provided with a seat for the driver, mounted and supported upon the frame-work of the machine, so that it may be made easy for the driver to do his work. The nature of our invention consists in forming an isosceles triangle, in the base of which we make the recess, which is located in the bottom of the hopper and which receives the seed and determines the quantity thereof designed to be dropped in each hill. The acute angle of this triangle is secured to the top of a longitudinal beam by means of a pivot-bolt, which allows the base of the isosceles to vibrate alternately back and forth across the beam before mentioned. It also consists in cross-arms located and secured to the main shaft or axle-tree, which are made to revolve by the two traction-wheels which support and carry the whole machine. These arms are of novel and peculiar form and are made to operate the seed-cells or recesses by imparting to them alternate and lateral or curvilinear motions, the radius being from the pivot-bolt of the isosceles triangle. It further consists in the combination of the said arms with the isosceles triangle; also, in the combination of the elevating and lowering device for the covering-blades, when attached to a corn-planter constructed and operated as herein shown and described.

To enable others skilled in the art to make and use our invention, we will proceed more particularly to describe its construction and operation.

Figure 1:
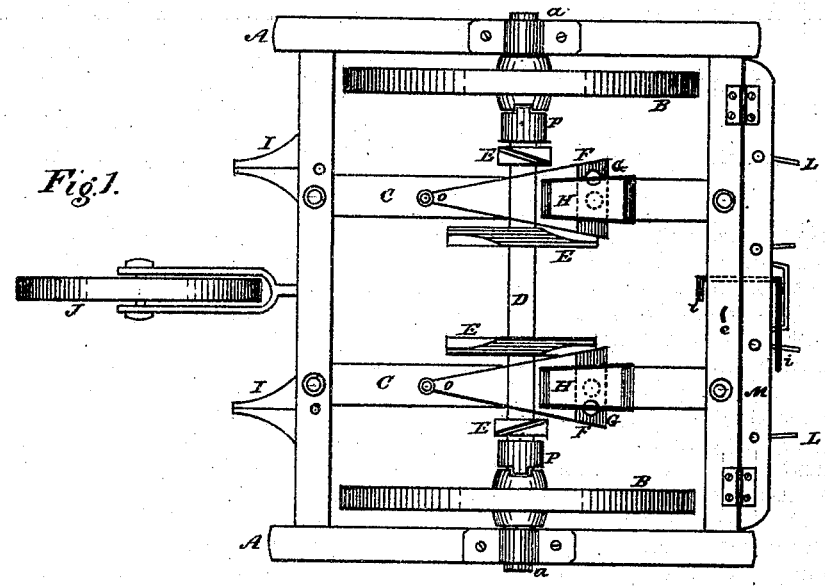
Figure 2:
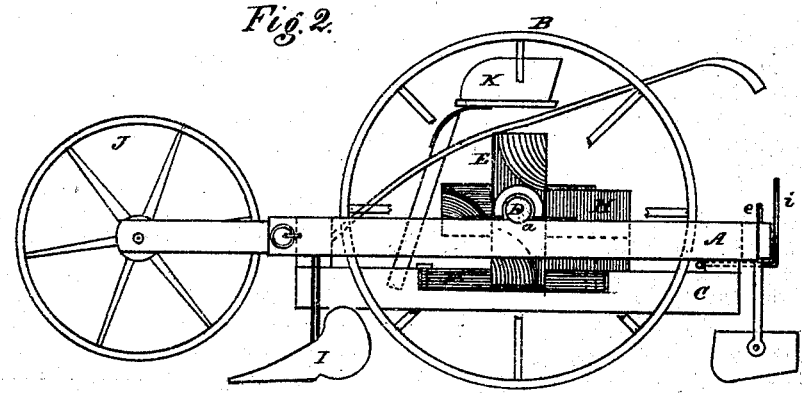

Figure 1 is a plan view of our invention. Fig. 2 is a side elevation of the same.

Letters of like name and kind indicate like parts in each of the figures.

A represents a rectangular frame mounted upon and supported by two traction-wheels, B B, of suitable strength and diameter, the frame A also being of proper dimensions to accommodate the machinery which embodies our invention. C C are two timbers secured longitudinally underneath the frame A and which extend from end to end of said frame. These timbers are essential in the construction and operation of our invention, as they support and form the bottom of the seed-cells and also support the hoppers. D shows the shaft or axle-tree to which the wheels B B are attached. On the outer ends of this shaft D are journals, which run in bearings *a a*, located and secured at about the middle of the frame A, so that the traction-wheels run just inside of the frame. Upon the shaft D are beveled cross-arms E E, set so that one comes on each side of the longitudinal timbers C C, and between these cross-arms are located and operated the triangles F F, in the bases of which are located the seed-cells G G. These triangles F F are of the isosceles form and are pivoted on the top of the timbers C C, at *o*. H H represent the hoppers in which the seed designed to be planted is deposited. They are placed immediately over the seed-cells G G. I I are furrowing-plows, which may be made of any desired form and secured to the frame in any convenient and well-known manner, and are designed to make the furrows which form the rows and into which the seed is deposited from the cells of the planter. These plows may be elevated and lowered, by the arrangement of any well-known device, so as to make the furrow deep or shallow, as may be desired. J shows a caster-wheel located in the front of the frame, which serves the purpose of steadying the frame as well as the whole of the machine. K is the driver's seat, a description of which is deemed unnecessary, as it is no part of our invention. L represents the covering blades attached underneath the bar M. The said bar M being hinged to the rear of the frame A allows the covering blades to be elevated above the surface of the ground when being conveyed from place to place, and are held in an elevated position by means of the lever $i$ being brought over, forward, and across the rear part of the frame, and secured there by being placed under the hook $e$. At P P are shown clutches which engage each other when the machine is made to operate. These clutches may be made to engage and disengage by means of levers or other means, as may be most convenient, as also may the method of fastening or attaching the horses to the machine.

The operation is simple and easy. The horse is first attached to the machine and the seed deposited in the hopper. The clutches are then engaged, which puts the beveled cross-arms in motion, which latter operate the triangle in the base of which is the seed-cell; and so when the arm is in such a position as to bring the cells within the hopper they are at once filled with seeds; and as the arms revolve the cell is carried outside the hopper and off the timber or bottom of the cells, when the seed falls down into the furrow and the covering-blades cover the seed.

Having thus described our invention, what we claim as new, and desire to secure by Letters Patent of the United States, is—

An isosceles triangle in which is the seed-cell, operated by means of the cross-arms E, substantially as and for the purposes set forth.

JOHN OTIS.
HENRY BRADT.

Witnesses:
JOHN S. THORNTON,
CHARLES ROGERS.